United States Patent
Ii et al.

(10) Patent No.: US 10,312,738 B2
(45) Date of Patent: Jun. 4, 2019

(54) WIRELESS POWER TRANSMISSION SYSTEM

(71) Applicant: TDK CORPORATION, Tokyo (JP)

(72) Inventors: Akihiro Ii, Tokyo (JP); Kazunori Oshima, Tokyo (JP); Yasuhiro Ozawa, Tokyo (JP); Ken Matsuura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 180 days.

(21) Appl. No.: 15/461,938

(22) Filed: Mar. 17, 2017

(65) Prior Publication Data

US 2017/0279310 A1   Sep. 28, 2017

(30) Foreign Application Priority Data

Mar. 22, 2016 (JP) ................................. 2016-057198

(51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC .................................. H02J 50/12; H02J 50/80
USPC ........................................................ 307/104
See application file for complete search history.

(56) References Cited

U.S. PATENT DOCUMENTS

2009/0243397 A1* 10/2009 Cook ...................... H02J 5/005
                                                             307/104
2012/0242160 A1    9/2012 Tseng

FOREIGN PATENT DOCUMENTS

JP       2013-198260 A      9/2013

* cited by examiner

*Primary Examiner* — Carlos Amaya
(74) *Attorney, Agent, or Firm* — Oliff PLC

(57) ABSTRACT

A wireless power transmission system includes a power feeding device and a power receiving device, wherein the power feeding device includes: a power feeding coil which receives an electric power to generate an AC magnetic field; an inverter for supplying an alternating-current power under a predetermined driving frequency to the power feeding coil; a current detection circuit for detecting a peak value of an alternating current flowing in the power feeding coil; and a controller for controlling the alternating current flowing in the power feeding coil. The power receiving device includes: a power receiving coil for receiving electric power wirelessly via the AC magnetic field; a power receiving side resonance capacitor which configures a power receiving side LC resonance circuit together with the power receiving coil; and a rectifier for rectifying the electric power received by the power receiving coil.

12 Claims, 2 Drawing Sheets

WIRELESS POWER TRANSMISSION SYSTEM

The present invention relates to a wireless power transmission system.

BACKGROUND

A wireless power transmission technology is known as a technology which uses the magnetic coupling between a primary (power feeding) coil and a secondary (power receiving) coil which face each other and transmits the energy of an alternate current applied to the primary coil to the secondary coil wirelessly.

In this wireless power transmission technology, when the state of the magnetic coupling between the primary coil and the secondary coil or the load state changes, the output of the rectifier falls into an unstable state. Thereby, it is necessary to control the output of the rectifier to a predetermined voltage, current, or power so as not to surpass the workable range of the element of the output stage. However, for the stable control of the output of the rectifier, it is necessary to monitor the state of the power receiving side at the power feeding side, but in the wireless power transmission technology, there is a problem that the state of the power receiving side cannot be monitored by a wired communication means since the power feeding side unit and the power receiving side unit are physically separated from each other.

In order to solve such a problem, for example, Patent Document 1 discloses a power transmission system including a power feeding device having a power feeding side controlling device for controlling an AC converter, and a power receiving device provided with a measuring communication device which measures the output voltage and the output current of a rectifier and transmits the measured results to the power feeding side controlling device, wherein, the power feeding side controlling device controls the AC converter to obtain a desired values of output voltage and output current of the rectifier based on the measured results of the output voltage and the output current of the rectifier received from the measuring communication device.

PATENT DOCUMENTS

Patent Document 1: JP2013-198260A

SUMMARY

However, in the technique disclosed in Patent Document 1, the means for monitoring the state on the power receiving side can be influenced by the state or the performance of wireless communication. That is, there is a problem that controlling may not be carried out due to a disruption of the wireless communication, or the controlling cannot be speeded up due to the limitation of communication speed while a high speed controlling is required.

The present invention has been made in view of the above problems, and it aims to provide a wireless power transmission system which can maintain a stable output voltage of the rectifier without using wireless communication during the main power feeding and provide a high speed of response for controlling the output voltage of the rectifier corresponding to the change of the load state.

In order to solve the problem mentioned above, the inventors have done a lot of intensive researches. As the result, it is found that when the driving frequency of the wireless power transmission substantially conforms to the resonance frequency of the power receiving side LC resonance circuit, it is possible to build a proportional relationship between the alternate current flowing in the power feeding coil and the output voltage of the rectifier. Thereby, the present invention has been completed.

The wireless power transmission system according to an embodiment of the present invention is a wireless power transmission system transmitting electric power from a power feeding device to a power receiving device wirelessly, wherein the power feeding device includes: a power feeding coil which receives an electric power to generate an AC magnetic field; an inverter which feeds an alternating-current power under a predetermined driving frequency to the power feeding coil; a current detection circuit for detecting a peak value of an alternating current flowing in the power feeding coil; and a controller for controlling the alternating current flowing in the power feeding coil, and the power receiving device includes: a power receiving coil receiving electric power wirelessly via the AC magnetic field; a power receiving side resonance capacitor which constitutes a power receiving side LC resonance circuit together with the power receiving coil; and a rectifier which rectifies the electric power received by the power receiving coil, wherein, the controller adjusts the driving frequency to substantially conform to the resonance frequency of the power receiving side LC resonance circuit and controls the alternating current flowing in the power feeding coil to be constant.

According to the embodiment of the present invention, the controller adjusts the driving frequency to substantially conform to the resonance frequency of the power receiving side LC resonance circuit. Therefore, it is possible to build a proportional relationship between the alternating current flowing in the power feeding coil and the output voltage of the rectifier. As a result, by controlling the alternating current flowing in the power feeding coil to be constant, the output voltage of the rectifier can be kept stable without using a wireless communication during the main power feeding. In addition, since the wireless communication is not used for controlling, a high speed of response for controlling the output voltage of the rectifier corresponding to the change in the load state can be obtained.

It is preferred that the difference between the driving frequency and the resonance frequency of the power receiving side LC resonance circuit is within 5% of the resonance frequency of the power-receiving side LC resonance circuit. In this case, it is possible to maintain the proportional relationship between the alternating current value flowing in the power feeding coil and the output voltage of the rectifier. As a result, if the coupling state between the coils is unchanged, the output voltage of the rectifier can be stably controlled by controlling the current value of the power feeding coil to be constant.

It is preferred that the power feeding device further includes a wireless receiving module and the power receiving device further includes a voltage detection circuit which detects the output voltage of the rectifier and a wireless transmission module which transmits the output voltage value detected by the voltage detection circuit to the wireless receiving module; and the controller performs a small power feeding, during which the output voltage value received by the wireless receiving module becomes constant, with a transmission power lower than that of main power feeding before the main power feeding; and the alternating current flowing in the power feeding coil can be controlled based on the peak value of the alternating current detected by the current detection circuit during the small power feeding. In this case, it is possible to control the alternating current of the power feeding coil to obtain a desired output voltage target value.

It is preferred that the power feeding device further includes a wireless receiving module and the power receiving device further includes a voltage detection circuit which detects the output voltage of the rectifier and a wireless transmission module which transmits the output voltage value detected by the voltage detection circuit to the wireless receiving module; and the controller performs a small power feeding using at least two different values of the output voltage values, during which the output voltage value received by the wireless receiving module becomes constant, with transmission power lower than that of a main power feeding before the main power feeding; and the alternating current flowing in the power feeding coil can be controlled based on the correlation between the different output voltage values and the different alternating current peak values, respectively, corresponding to the different output voltage values detected by the current detection circuit. In this case, it is possible to control the alternating current of the power feeding coil to obtain an arbitrary output voltage target value.

It is preferred that the controller can control the alternating current flowing in the power feeding coil by changing the input voltage of the inverter. In this case, it is possible to control the alternating current flowing in the power feeding coil so as to obtain a desired or an arbitrary output voltage target value.

It is preferred that the controller can control the alternating current flowing in the power feeding coil by changing the driving frequency of the inverter. In this case, it is possible to control the alternating current flowing in the power feeding coil so as to obtain a desired or an arbitrary output voltage target value.

It is preferred that the controller can control the alternating current flowing in the power feeding coil by changing the time ratio of the inverter. In this case, it is possible to control the alternating current flowing in the power feeding coil so as to obtain a desired or an arbitrary output voltage target value.

It is preferred that a power feeding side resonance capacitor constituting a power feeding side LC resonance circuit with the power feeding coil can be further provided. In this case, the power transmission efficiency of the wireless power transmission system can be increased even when the separation distance between the feeding and receiving coils increases.

According to an embodiment of the present invention, a wireless power transmission system can be provided which can maintain a stable output voltage of the rectifier without using a wireless communication during the main power feeding and provide a high speed of response for controlling the output voltage of the rectifier corresponding to the change of the load state.

DETAILED DESCRIPTION OF EMBODIMENTS

Figure 1:
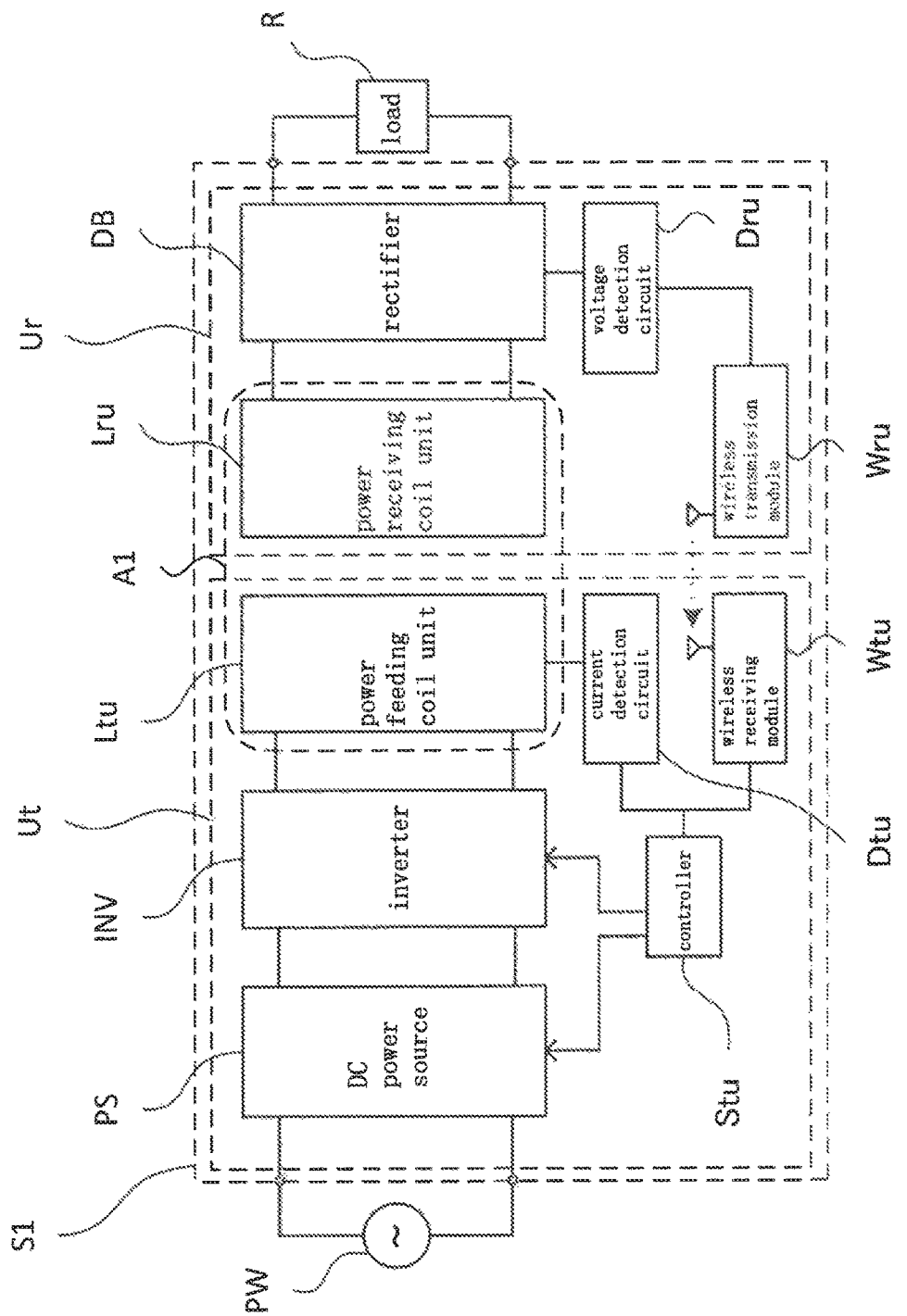
FIG. 1 is a block diagram showing the configuration of the wireless power transmission system according to the first embodiment of the present invention together with an AC power source and a load.

Embodiments for executing the present invention will be described in detail with reference to the drawings. In the description, the same symbols or reference numerals will be attached to the same elements or the elements having the same functions, and repeated description will be omitted.

First Embodiment

Figure 2:
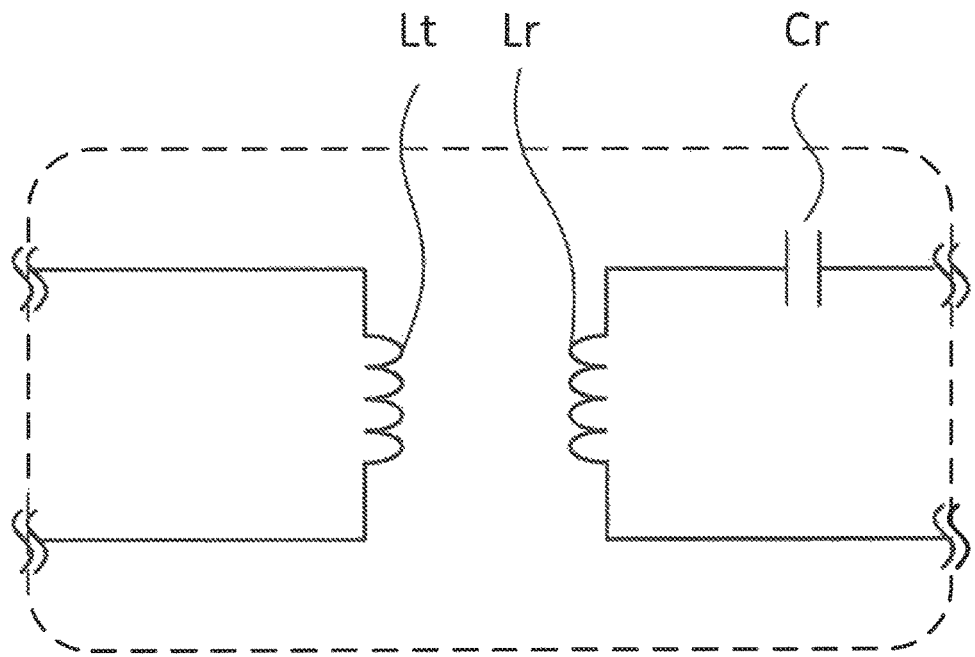
FIG. 2 is a partial enlarged view showing a region A1 in the wireless power transmission system according to the first embodiment of the present invention as shown in FIG. 1.

An entire configuration of a wireless power feeding system S1 according to a first embodiment of the present invention will be first described with reference to FIG. 1 and FIG. 2. FIG. 1 is a block diagram showing the configuration of the wireless power transmission system according to the first embodiment of the present invention together with an AC power source and a load. FIG. 2 is a partial enlarged view showing a region A1 in the wireless power transmission system according to the first embodiment of the present invention as shown in FIG. 1.

Wireless power transmission system S1 is provided with power feeding device Ut and power receiving device Ur as shown in FIG. 1.

Power feeding device Ut is provided with a DC power source PS, an inverter INV, a power feeding coil unit Ltu, a current detection circuit Dtu, a controller Stu and a wireless receiving module Wtu. Power receiving device Ur is provided with a rectifier DB, a power receiving coil unit Lru, a voltage detection circuit Dru and a wireless transmission module Wru.

The DC power source PS converts the alternating-current power supplied from the AC power source PW into a direct current power and supplies it to the inverter INV. As such DC power source PS, it is not particularly limited as long as it can vary the output voltage according to the instruction from the controller Stu and output the direct current power to the inverter INV, which can be listed as a variable DC stabilized power source, a PFC (power factor correction circuit) with variable output voltage, a DC stabilized power source, or a power source with a DCFC converter connected to the output of the PFC or the like. Further, as an AC power source PW, it is not particularly limited as long as it can supply an alternating-current power to the DC power source PS. For example, a commercial power source of 50/60 Hz may be listed.

The inverter INV has a function of converting a direct current power supplied from the DC power source PS into an alternating-current power and feeding the alternating-current power to the power feeding coil Lt of the power feeding coil unit Ltu with a predetermined driving frequency, and it is constituted by a switching circuit with several switching elements bridge connected. As such switching elements, for example, elements such as a MOS-FET (Metal Oxide Semiconductor-Field Effect Transistor) or an IGBT (Insulated Gate Bipolar Transistor) or the like can be listed. In the present embodiment, a case where a full-bridge type switching circuit in which four MOS-FETs are bridge-connected is used will be described.

As shown in FIG. 2, the power feeding coil unit Ltu comprises a power feeding coil Lt. The power feeding coil Lt is constructed by winding a conductive wire such as copper or aluminum, and is packaged in a case. The power feeding coil Lt receives electric power from the inverter INV and generates an AC magnetic field. Specifically, when an alternating-current voltage of a predetermined driving frequency is supplied from the inverter INV to the power feeding coil Lt, an alternating current flows to generate an AC magnetic field. Further, when the wireless power transmission system S1 according to the present embodiment is applied to a power feeding facility for a vehicle such as an electric vehicle, the power feeding coil Lt is disposed in the ground or in the vicinity of the ground. In addition, the power feeding coil unit Ltu may include a magnetic body for enhancing the magnetic coupling between the power transmission and power receiving coils or a conductive shielding material for reducing unnecessary magnetic field leakage.

The current detection circuit Dtu has a function of detecting the peak value of the alternating current flowing in the power feeding coil Lt, converting the detected the peak value of the alternating current to a voltage signal and outputting it to the controller Stu. As such a current detection circuit Dtu, for example, a circuit using a current sensor such as CT (Current Transformer) or the like can be listed.

The controller Stu has a function of achieving the operation of the inverter INV which converts the direct current power supplied from the DC power source PS into an alternating-current power by controlling the ON/OFF operation of the switching element of the inverter INV. Furthermore, in the present embodiment, the controller Stu has a function of adjusting the driving frequency of the inverter INV to substantially conform to the resonance frequency of the power receiving side LC resonance circuit and a function of controlling the alternating-current current flowing in the power feeding coil to be constant. Herein, "substantially conforms to" means to make the resonance frequency of the power receiving side LC resonance circuit being close to the driving frequency of the inverter INV within a range in which a proportional relationship can be built between the alternating current flowing in the power feeding coil Lt and the output voltage of the rectifier DB. Further, it is preferred that the difference between the driving frequency of the inverter INV and the resonance frequency of the power receiving side LC resonance circuit described later is as small as possible, however, the difference is preferred to be adjusted to be within 5% relative to the resonance frequency of the power receiving side LC resonance circuit if the following is considered, i.e. the unevenness of the inductance of the power reception coil Lr described later, the unevenness of the capacitance of the power receiving side resonance capacitor Cr described later, or the mismatch between the driving frequency of the inverter INV and the resonance frequency of the power receiving side LC resonance circuit described later when the alternating current flowing in the power feeding coil Lt is controlled to be constant by varying the driving frequency of the inverter INV by the controller Stu. In this case, the proportional relationship between the alternating current flowing in the power feeding coil Lt and the output voltage of the rectifier DB can be maintained. Further, as means to decrease the difference between the driving frequency of the inverter INV and the resonance frequency of the power receiving side LC resonance circuit described later as small as possible, the controller Stu can be constructed to have a frequency tracking function such as PLL (Phase Locked Loop) or the like. Further, in the present embodiment, the alternating current flowing in the power feeding coil Lt is controlled to follow a predetermined target value by a function of controlling the alternating current flowing in the power feeding coil Lt to be constant. Specifically, the controller Stu can realize the function of controlling the alternating current flowing in the power feeding coil Lt to be constant by any one of the following 3 methods. As the first method, there is a method to control the alternating current flowing in the power feeding coil Lt by changing the input voltage of the inverter INV by controlling the DC power source PS. In this method, the controller Stu controls the driving frequency of the inverter INV to substantially conform to the resonance frequency of the power receiving side LC resonance circuit. As the second method, there is a method to control the alternating current flowing in the power feeding coil Lt by changing the time ratio of the switching element of the inverter INV. In this method, the driving frequency of the inverter INV is adjusted to substantially conform to the resonance frequency of the power receiving side LC resonance circuit as in the first method. As the third method, there is a method to control the alternating current flowing in the power feeding coil Lt by changing the driving frequency of the inverter INV by controlling the frequency of the gate drive voltage for the switching element of the inverter INV. In this method, since the controller Stu adjusts the driving frequency of the inverter INV to conform to the resonance frequency of the power receiving side LC resonance circuit, the driving frequency of the inverter INV is changed in the range in which the difference between the driving frequency of the inverter INV and the resonance frequency of the power receiving side LC resonance circuit described below is within 5% relative to the resonance frequency of the power receiving side LC resonance circuit. In the first and second methods, since the input voltage and the time ratio are positively correlated with the alternating current flowing in the power feeding coil Lt, the alternating current flowing in the power feeding coil Lt can be controlled to be constant by decreasing the input voltage and the time ratio while the alternating current flowing in the power feeding coil Lt is increased and increasing the input voltage and the time ratio while the alternating current flowing in the power feeding coil Lt is decreased. In the third method, depending on the frequency characteristics determined by the circuit configurations of the power feeding side and the power receiving side, the alternating current flowing in the power feeding coil Lt can be controlled to be constant by raising or lowering the driving frequency of the inverter INV in the direction of counteracting the increase or decrease of the alternating current flowing in the power feeding coil Lt.

The wireless receiving module Wtu is connected to the controller Stu and has a function of receiving the control signal indicating the output voltage value of the rectifier DB which is transmitted by the wireless transmission module Wru and detected by the voltage detection circuit Dru, and outputting the control signal to the controller Stu. As protocols used for wireless communication, for example, Wi-Fi (registered trademark), Bluetooth (registered trademark), or the like can be listed.

Next, the configuration of the power receiving device Ur will be described. As shown in FIG. 2, the power receiving coil unit Lru includes a power receiving coil Lr and a power receiving side resonance capacitor Cr.

The power receiving coil Lr is constructed by winding a conductive wire such as copper or aluminum or the like and is packaged in a case. The power receiving coil Lr has a function of wirelessly receiving electric power via an AC magnetic field generated by the power feeding coil Lt.

Specifically, when the power receiving coil Lr receives an AC magnetic field generated by the power feeding coil Lt, an electromotive force will be generated and an alternating current flows. Further, when the wireless power transmission system S1 according to the present embodiment is applied to a power source facility for a vehicle such as an electric vehicle, the power receiving coil Lr will be mounted on the lower part of the vehicle. In addition, the power receiving coil unit Lru may include a magnetic material for enhancing the magnetic coupling between the feeding and receiving coils and a conductive shielding material for reducing unnecessary magnetic fields leakage.

The power receiving side resonance capacitor Cr constitutes a power receiving side LC resonance circuit together with the power receiving coil Lr. The resonance frequency of the power receiving side LC resonance circuit is set by the inductance of the power receiving coil Lr and the electrostatic capacity of the power receiving side resonance capacitor Cr. The power receiving side resonance capacitor Cr may be connected to the power receiving coil Lr in series, or in parallel, or in a combination of series and parallel. In the present embodiment, the power receiving side resonance capacitor Cr is connected in series to the power receiving coil Lr and constitutes an LC series resonance circuit.

The rectifier DB is connected to the output of the power receiving coil unit Lru and has a function of rectifying the alternating current power received by the power receiving coil Lr into a direct current power. As the rectifier DB, conversion circuit having a full-wave rectification function using a diode bridge and a power smoothing function using a capacitor and a three-terminal regulator or the like can be listed as an example. The direct current power rectified by the rectifier DB is output to the load R. Herein, as the load R, a secondary battery or a rotating machine possessed by the vehicle can be listed when the wireless power transmission system S1 according to the present embodiment is applied to a power source facility for a vehicle such as an electric vehicle. When the load R is an AC rotary machine, it is necessary to add an inverter (not shown in the figures) between the rectifier DB of the wireless power receiving device Ur and the load R so as to provide an alternating current power to the AC rotary machine.

The voltage detection circuit Dru is connected to the rectifier DB and has a function of detecting the output voltage of the rectifier DB by the voltage of divider resistance or the like, converting the detected output voltage value into a controlling signal, and outputting it to the wireless transmission module Wru.

The wireless transmission module Wru has a function of transmitting a controlling signal indicating the output voltage value of the rectifier DB detected by the voltage detection circuit Dru to the wireless receiving module Wtu provided in the power feeding device Ut. As protocols used for wireless communication, for example, Wi-Fi (registered trademark), Bluetooth (registered trademark), or the like can be listed.

With such a configuration, a wireless power transmission system S1 in which power is wirelessly transmitted from the power feeding device Ut to the power receiving device Ur can be obtained by making the power feeding coil Lt and the power reception coil Lr opposed to each other.

Subsequently, the operations of the wireless power transmission system S1 according to the first embodiment of the present invention based on the above configuration will be described in detail. In the present description, it is assumed that the relative positional relationship between the power feeding coil Lt and the power receiving coil Lr arranged opposite to each other is invariable during the operations. Further, as a means for controlling the alternating current flowing in the power feeding coil Lt to be constant, a case of using a method of changing the input voltage of the inverter INV will be described.

The operations of the wireless power transmission system S1 of this embodiment is divided into two steps. First, the first step is a small power feeding step which is performed before the second step to obtain the target value of the alternating current flowing in the power feeding coil Lt corresponding to the desired output voltage of the rectifier DB. The second step is performed after the first step and is a main power feeding step of transmitting a desired power while controlling the alternating current flowing in the power feeding coil Lt to a target value. Herein, the small power feeding performed before the main power feeding is set with a lower transmission power than the main power feeding.

In the first step, the controller Stu sets the input voltage of the inverter INV to a predetermined voltage to perform the small power feeding. The input voltage of the inverter INV at this time depends on the relative positional relationship between the power feeding coil Lt and the power receiving coil Lr. However, for example, it is preferred to be a voltage in which the power (transmission power) transmitted to the power receiving side in the first step is about 10 to 30% of the power (transmission power) transmitted to the power receiving side in the second step. Next, the controller Stu adjusts the driving frequency of the inverter INV to substantially conform to the resonance frequency of the power receiving side LC resonance circuit, and then obtains the controlling signal indicating the output voltage value of the rectifier DB detected by the voltage detection circuit Dru through the wireless communication between the wireless transmission module Wru and the wireless receiving module Wtu, and then controls the input voltage of the inverter INV based on the control signal to control the output voltage of the rectifier DB to substantially conform to the target voltage (desired voltage). Further, the peak value of the alternating current flowing in the power feeding coil Lt is detected by the current detection circuit Dtu in a state in which the driving frequency of the inverter INV substantially conforms to the resonance frequency of the receiving side LC resonance circuit and the output voltage of the rectifier DB substantially conforms to the target voltage value. And the peak value of the alternating current is set as the target value of the alternating current flowing in the power feeding coil Lt which is to be controlled to be constant in the second step.

In the second step, the controller Stu adjusts the driving frequency of the inverter INV to substantially conform to the resonance frequency of the receiving side LC resonance circuit, and controls the peak value of the alternating current flowing in the power feeding coil Lt detected by the current detection circuit Dtu to the target value set in the first step, and meanwhile, increases the input voltage of the inverter INV until the power received by the power receiving device Ur reaches a desired power, and after the desired power is reached, adjusts, until the completion of the power transmission, the driving frequency of the inverter INV to substantially conform to the resonance frequency of the receiving side LC resonance circuit and controls the peak value of the alternating current flowing in the power feeding coil Lt. Herein, since the alternating current flowing in the power feeding coil Lt and the output voltage of the rectifier DB have a proportional relationship, even when the transmission power increases from the first step, the output voltage of the rectifier DB can be constantly controlled to be a desired voltage by constantly controlling the current peak value flowing in the power feeding coil Lt to be the target value. Further, in the present embodiment, even the function of transmitting the output voltage (controlling signal indicating the output voltage value) of the rectifier DB to the power feeding device Ut using a wireless receiving module Wtu, a wireless transmission module Wru and a voltage detection circuit Dru is not used in the controlling of power in the second step, the operation of the wireless communication may be continued during the second step for the purpose of, for example, monitoring the output overvoltage of the rectifier DB.

As described above, in the present embodiment, the controller Stu performs a small power feeding with a lower transmission power than the main power feeding, in which the output voltage value of the rectifier DB received by the wireless receiving module Wtu is constant, before the main power feeding, and controls the alternating current flowing in the power feeding coil Lt during the main power feeding based on the peak of the alternating current detected by the current detection circuit Dtu during the small power feeding. Thereby, the alternating current flowing in the power feeding coil Lt can be controlled so that the output voltage of the rectifier DB becomes the desired target value.

As described above, the wireless power transmission system S according to the present embodiment is a wireless power transmission system S1 which wirelessly transmits electric power from the power feeding device Ut to the power receiving device Ur. The power feeding device Ut is provided with a power feeding coil Lt for receiving an electric power to generate an AC magnetic field, an inverter INV for providing alternating current power with a predetermined driving frequency to the power feeding coil Lt, a current detection circuit Dtu for detecting the peak value of the alternating current flowing in the power feeding coil Lt, and a controller Stu for controlling the alternating current flowing in the power feeding coil Lt. The power receiving device Ur is provided with a power receiving coil Lr for wirelessly receiving power via an AC magnetic field, a power receiving side resonance capacitor Cr constituting the power receiving side LC resonance circuit together with the power receiving coil Lr, and a rectifier DB for rectifying the electric power received by the receiving coil Lr. The controller Stu adjusts the driving frequency to substantially conform to the resonance frequency of the receiving side LC resonance circuit and controls the alternating current flowing in the power feeding coil Lt to be constant. Therefore, it is possible to build a proportional relationship between the alternating current flowing in the power feeding coil Lt and the output voltage of the rectifier DB. As a result, the output voltage of the rectifier DB can be kept stable without using a wireless communication during the main power feeding by controlling the alternating current flowing in the power feeding coil Lt to be constant. Further, since the wireless communication is not used for control, a high speed of response for controlling the output voltage of the rectifier DB corresponding to the state change of the load R can be obtained.

Further, in the wireless power transmission system S1 according to the present embodiment, the power feeding device Ut further includes a wireless receiving module Wtu, and the power receiving device Ur further includes a voltage detection circuit Dru for detecting the output voltage of the rectifier DB and a wireless transmission module Wru which transmits the output voltage value detected by the voltage detection circuit Dru to the wireless receiving module Wtu. The controller Stu performs a small power feeding with a lower transmission power than the main power feeding, in which the output voltage value received by the wireless receiving module Wtu is constant, before the main power feeding, and controls the alternating current flowing in the power feeding coil Lt based on the peak value of the alternating current detected by the current detection circuit Dtu during the small power feeding. Thereby, the alternating current flowing in the power feeding coil Lt can be controlled to obtain the desired target value of output voltage.

Second Embodiment

Subsequently, a wireless power transmission system according to a second embodiment of the present invention will be described. In the present embodiment, in the operation of the wireless power transmission system S according to the first embodiment, a small power feeding is performed with at least two different output voltages of the rectifier DB instead of desired output voltage of the rectifier DB. The second embodiment is different from the first embodiment on this point. Further, the configuration of the wireless power transmission system according to the present embodiment is similar to that of the wireless power transmission system S1 according to the first embodiment. The differences from the first embodiment will be mainly described below.

The operations of the wireless power transmission system of this embodiment are divided into two steps. First, the first step is a small power feeding step for obtaining alternating current peak values flowing in the power feeding coil Lt corresponding to at least two different output voltages of the rectifier DB, and the second step is the main power feeding step for transmitting a desired power while controlling the alternating current flowing in the power feeding coil Lt to the target value of the alternating current flowing in the power feeding coil Lt corresponding to the arbitrary output voltage target value of the rectifier DB. Further, similar to the first embodiment, the small power feeding performed before the main power feeding is set to a lower transmission power than the main power feeding.

In the first step, the controller Stu sets the input voltage of the inverter INV to a predetermined voltage to perform the small power feeding. Next, the controller Stu adjusts the driving frequency of the inverter INV to substantially conform to the resonance frequency of the power receiving side LC resonance circuit, and then obtains the signal of the output voltage value of the rectifier DB detected by the voltage detection circuit Dru through the wireless communication between the wireless transmission module Wru and the wireless receiving module Wtu, and then, based on this signal, control the output voltage of the rectifier DB to be at least two or more different target voltage values. The input voltage of the inverter INV at this time depends on the relative positional relationship between the power feeding coil Lt and the power receiving coil Lr. However, for example, it is preferred to be a voltage in which the power (transmission power) transmitted to the power receiving side in the first step is about 10 to 30% of the power (transmission power) transmitted to the power receiving side in the second step. Next, the peak values of the alternating current flowing in the power feeding coil Lt is detected by the current detection circuit Dtu respectively in a state in which the driving frequency of the inverter INV substantially conforms to the resonance frequency of the receiving side LC resonance circuit and the output voltages of the rectifier DB substantially conforms to the at least two or more different target voltage values. And the correlation between the peak values of the alternating current and the different output voltages of the rectifier DB can be calculated.

In the second step, the controller Stu arbitrarily sets the target value of the output voltage of the rectifier DB. This target value is determined on the power transmission efficiency of the wireless power transmission system in the relative positional relationship between the power transmission coil Lt and the power receiving coil Lru at that time, and the allowable value of the alternating current that can flow in the power receiving coil Lru, and the like. Next, the controller Stu calculates the target value of the alternating current flowing in the power feeding coil Lt based on the correlation between the alternating current flowing in the power feeding coil Lt and the output voltage of the rectifier DB obtained in the first step, and sets this value as the target value of the alternating current flowing in the power feeding coil Lt which is controlled to be constant. Further, since there is a proportional relationship between the alternating current flowing in the power feeding coil Lt and the output voltage of the rectifier DB, for example, the alternating current peak values flowing in the power feeding coil Lt corresponding to two different output voltages of the rectifier DB can be obtained, and the target value of the alternating current flowing in the power feeding coil Lt corresponding to an arbitrary output voltage of rectifier DB can be approximately calculated from the line that connects the two points. Subsequently, the controller Stu adjusts the driving frequency of the inverter INV to substantially conform to the resonance frequency of the receiving side LC resonance circuit, and constantly controls the peak value of the alternating current flowing in the power feeding coil Lt detected by the current detection circuit Dtu to the target value, and meanwhile, increases the input voltage of the inverter INV until the power received by the power receiving device Ur reaches a desired power, and after the desired power is reached, adjusts, until the completion of the power transmission, the driving frequency of the inverter INV to substantially conform to the resonance frequency of the receiving side LC resonance circuit and controls the peak value of the alternating current flowing in the power feeding coil Lt to be constant. Herein, since the alternating current flowing in the power feeding coil Lt and the output voltage of the rectifier DB have a proportional relationship, even when the transmission power increases from the first step, the output voltage of the rectifier DB can be constantly controlled to be a desired voltage by constantly controlling the current peak value flowing in the power feeding coil Lt. Further, in the present embodiment, although the function of transmitting the output voltage (controlling signal indicating the output voltage value) of the rectifier DB to the power feeding device Ut using a wireless receiving module Wtu, a wireless transmission module Wru and a voltage detection circuit Dru is not used in the controlling of power in the second step, the operation of the wireless communication may be continued during the second step for the purpose of, for example, monitoring the output overvoltage of the rectifier DB.

As described above, in the present embodiment, the controller Stu performs a small power feeding using at least two or more different output voltage values of the rectifier DB, during which the output voltage value of the rectifier DB received by the wireless receiving module Wtu is constant, with a lower transmission power than the main power feeding before the main power feeding, and controls the alternating current flowing in the power feeding coil Lt based on the correlation of the peak values of the alternating current detected by the current detection circuit Dtu respectively corresponding to the different output voltage values of the rectifier DB and the different output voltage values of the rectifier DB. Thereby, the alternating current flowing in the power feeding coil Lt can be controlled so that the output voltage of the rectifier DB becomes the arbitrary target value.

As described above, the wireless power transmission system according to the present embodiment is a wireless power transmission system which wirelessly transmits electric power from the power feeding device Ut to the power receiving device Ur. The power feeding device Ut is provided with a power feeding coil Lt for receiving an electric power to generate an AC magnetic field, an inverter INV for providing alternating current power with a predetermined driving frequency to the power feeding coil Lt, a current detection circuit Dtu for detecting the peak value of the alternating current flowing in the power feeding coil Lt, and a controller Stu for controlling the alternating current flowing in the power feeding coil Lt. The power receiving device Ur is provided with a power receiving coil Lr for wirelessly receiving power via an AC magnetic field, a power receiving side resonance capacitor Cr constituting the power receiving side LC resonance circuit together with the power receiving coil Lr, and a rectifier DB for rectifying the electric power received by the receiving coil Lr. The controller Stu adjusts the driving frequency to substantially conform to the resonance frequency of the receiving side LC resonance circuit and controls the alternating current flowing in the power feeding coil Lt to be constant. Therefore, it is possible to build a proportional relationship between the alternating current flowing in the power feeding coil Lt and the output voltage of the rectifier DB. As a result, the output voltage of the rectifier DB can be kept stable without using a wireless communication during the main power feeding by controlling the alternating current flowing in the power feeding coil Lt to be constant. Further, since the wireless communication is not used for control, a high speed of response for controlling the output voltage of the rectifier DB corresponding to the state change of the load R can be obtained.

Further, in the wireless power transmission system according to the present embodiment, the power feeding device Ut further includes a wireless receiving module Wtu, and the power receiving device Ur further includes a voltage detection circuit Dru for detecting the output voltage of the rectifier DB and a wireless transmission module Wru which transmits the output voltage value detected by the voltage detection circuit Dru to the wireless receiving module Wtu. The controller Stu performs a small power feeding using at least two or more different output voltages, during which the output voltage value received by the wireless receiving module Wtu is constant, with a lower transmission power than the main power feeding before the main power feeding, and controls the alternating current flowing in the power feeding coil Lt based on the correlation between the peak values of the alternating current detected by the current detection circuit Dtu respectively corresponding to the different output voltage values and the different output voltage value. Thereby, the alternating current flowing in the power feeding coil Lt can be controlled so as to obtain the arbitrary output voltage target value.

Third Embodiment

Figure 3:
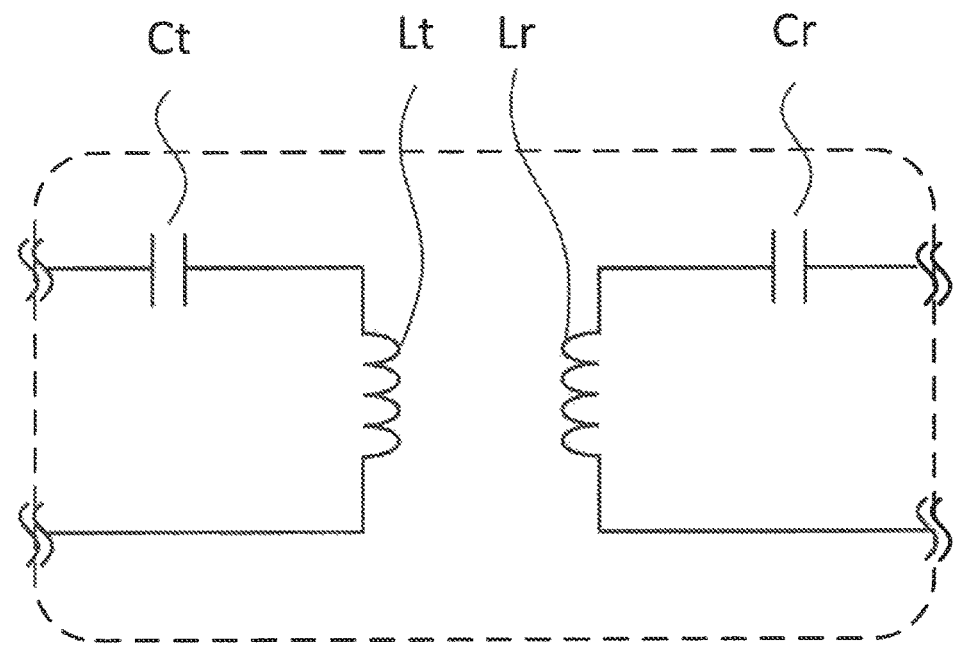
FIG. 3 is a partial enlarged view showing a region A1 in the wireless power transmission system according to the third embodiment of the present invention which corresponds to the partial enlarged view showing the region A1 in the wireless power transmission system according to the first embodiment of the present invention as shown in FIG. 1.

Subsequently, a wireless power transmission system according to a third embodiment of the present invention will be described with reference to FIG. 3. FIG. 3 is a partial enlarged view showing a region A1 in the wireless power transmission system according to the third embodiment of the present invention which corresponds to the partial enlarged view showing the region A1 in the wireless power transmission system according to the first embodiment of the present invention as shown in FIG. 1. The wireless power transmission system according to the third embodiment is different from the first embodiment in that the power feeding coil unit Ltu includes a power feeding side resonance capacitor Ct in addition to the power feeding coil Lt. Further, the configuration and the operations of the wireless power transmission system according to the third embodiment except the above feature are the same as those of the wireless power transmission system S1 according to the first embodiment. The differences from the first embodiment will be mainly described below.

In the present embodiment, the power feeding coil unit Ltu includes a power feeding coil Lt and a power feeding side resonance capacitor Ct.

The power feeding side resonance capacitor Ct constitutes a power feeding side LC resonance circuit together with the power feeding coil Lt. The resonance frequency of the power feeding side LC resonance circuit is set by the inductance of the power feeding coil Lt and the electrostatic capacitance of the power feeding side resonance capacitor Ct. The power feeding side resonance capacitor Ct may be connected to the power feeding coil Lt in series, or in parallel, or in a combination of series and parallel. In the present embodiment, the power feeding side resonance capacitor Ct is connected in series to the power feeding coil Lt, and constitutes an LC series resonance circuit.

As described above, in the present embodiment, the power feeding coil unit Ltu further includes a power feeding side resonance capacitor Ct constituting a power feeding side LC resonance circuit with power feeding coil Lt. Therefore, by appropriately setting the resonance frequency of the power feeding side LC resonance circuit, the transmission efficiency of the wireless power transmission can be further increased by electromagnetic field coupling between the power feeding side LC resonance circuit and the power receiving side LC resonance circuit.

As described above, the wireless power transmission system according to the present embodiment is a wireless power transmission system which wirelessly transmits electric power from the power feeding device Ut to the power receiving device Ur. The power feeding device Ut is provided with a power feeding coil Lt for receiving an electric power to generate an AC magnetic field, an inverter INV for providing alternating current power with a predetermined driving frequency to the power feeding coil Lt, a current detection circuit Dtu for detecting the peak value of the alternating current flowing in the power feeding coil Lt, and a controller Stu for controlling the alternating current flowing in the power feeding coil Lt. The power receiving device Ur is provided with a power receiving coil Lr for wirelessly receiving power via an AC magnetic field, a power receiving side resonance capacitor Cr constituting the power receiving side LC resonance circuit together with the power receiving coil Lr, and a rectifier DB for rectifying the electric power received by the receiving coil Lr. The controller Stu adjusts the driving frequency to substantially conform to the resonance frequency of the receiving side LC resonance circuit and controls the alternating current flowing in the power feeding coil Lt to be constant. Therefore, it is possible to build a proportional relationship between the alternating current flowing in the power feeding coil Lt and the output voltage of the rectifier DB. As a result, the output voltage of the rectifier DB can be kept stable without using a wireless communication during the main power feeding by controlling the alternating current flowing in the power feeding coil Lt to be constant. Further, since the wireless communication is not used for control, a high speed of response for controlling the output voltage of the rectifier DB corresponding to the state change of the load R can be obtained.

In addition, the wireless power transmission system according to the present embodiment further includes a power feeding side resonance capacitor Ct constituting a power feeding side LC resonance circuit with the power feeding coil Lt. Therefore, the power transmission efficiency of the wireless power transmission system can be increased even when the clearance between the feeding and receiving coils increases.

Hereinabove, the present invention has been described based on the embodiments, but the present invention is not limited to the above-described embodiments, and various modifications and changes are possible. For example, the characteristic configuration and function in the wireless power transmission system according to the third embodiment described above may be applied to the wireless power transmission system according to the second embodiment. In this case, in addition to the effects of the wireless power transmission system according to the second embodiment, an effect of increasing the power transmission efficiency of the wireless power transmission system can further be obtained even when the separation distance between the feeding and receiving coils increases.

The wireless power transmission system according to the present invention can be widely used in a wireless power transmission system for a vehicle such as an electric vehicle (BEV: Battery Electric Vehicle) and a plug-in hybrid electric vehicle (PHEV: Plug-in Hybrid Electric Vehicle) or the like.

DESCRIPTION OF REFERENCE NUMERALS

S1 . . . wireless power transmission system
Ut . . . power feeding device
PW . . . AC power source
PS . . . DC power source
INV . . . inverter
Ltu . . . power feeding coil unit
Lt . . . power feeding coil
Ct . . . power feeding side resonance capacitor
Dtu . . . current detection circuit
Stu . . . controller
Wtu . . . wireless receiving module
Ur . . . power receiving device
DB . . . rectifier
R . . . load,
Lru . . . power receiving coil unit
Lr . . . power receiving coil
Cr . . . power receiving side resonance capacitor
Dru . . . voltage detection circuit
Wru . . . wireless transmission module

What is claimed is:
1. A wireless power transmission system for wirelessly transmitting electric power from a power feeding device to a power receiving device, wherein,
the power feeding device comprises: a power feeding coil which receives an electric power to generate an AC magnetic field; an inverter for providing an alternating-current power with a predetermined driving frequency to the power feeding coil; a current detection circuit for detecting a peak value of an alternating current flowing in the power feeding coil; a wireless receiving module;

and a controller for controlling the alternating current flowing in the power feeding coil, the power receiving device comprises: a power receiving coil for receiving electric power wirelessly via the AC magnetic field; a power receiving side resonance capacitor which constitutes a power receiving side LC resonance circuit together with the power receiving coil; a rectifier for rectifying the electric power received by the power receiving coil; a voltage detection circuit which detects the output voltage of the rectifier; and a wireless transmission module which transmits the output voltage value detected by the voltage detection circuit to the wireless receiving module;

the controller (1) adjusts the driving frequency to substantially conform to a resonance frequency of the power receiving side LC resonance circuit and controls the alternating current flowing in the power feeding coil to be constant; (2) performs a small power feeding, during which the output voltage value received by the wireless receiving module becomes constant, with a transmission power lower than that of a main power feeding before the main power feeding; and (3) controls the alternating current flowing in the power feeding coil based on the peak value of the alternating current detected by the current detection circuit during the small power feeding.

2. The wireless power transmission system according to claim 1, wherein, a difference between the driving frequency and the resonance frequency of the power receiving side LC resonance circuit is within 5% relative to the resonance frequency of the power-receiving side LC resonance circuit.

3. A wireless power transmission system for wirelessly transmitting electric power from a power feeding device to a power receiving device, wherein, the power feeding device comprises: a power feeding coil which receives an electric power to generate an AC magnetic field; an inverter for providing an alternating-current power with a predetermined driving frequency to the power feeding coil; a current detection circuit for detecting a peak value of an alternating current flowing in the power feeding coil; a controller for controlling the alternating current flowing in the power feeding coil; and a wireless receiving module, the power receiving device comprises: a power receiving coil for receiving electric power wirelessly via the AC magnetic field; a power receiving side resonance capacitor which constitutes a power receiving side LC resonance circuit together with the power receiving coil; a rectifier for rectifying the electric power received by the power receiving coil; a voltage detection circuit which detects the output voltage of the rectifier; and a wireless transmission module which transmits the output voltage value detected by the voltage detection circuit to the wireless receiving module, the controller adjusts the driving frequency to substantially conform to a resonance frequency of the power receiving side LC resonance circuit; controls the alternating current flowing in the power feeding coil to be constant; performs a small power feeding using at least two different values of the output voltage values, during which the output voltage value received by the wireless receiving module becomes constant, with a transmission power lower than that of a main power feeding before the main power feeding; and controls the alternating current flowing in the power feeding coil based on the correlation between the different output voltage values and the different alternating current peak values corresponding to the different output voltage values, respectively, detected by the current detection circuit.

4. The wireless power transmission system according to claim 1, wherein, the controller controls the alternating current flowing in the power feeding coil by changing the input voltage of the inverter.

5. The wireless power transmission system according to claim 1, wherein, the controller controls the alternating current flowing in the power feeding coil by changing the driving frequency of the inverter.

6. The wireless power transmission system according to claim 1, wherein, the controller controls the alternating current flowing in the power feeding coil by changing the time ratio of the inverter.

7. The wireless power transmission system according to claim 1, wherein, the wireless power transmission system further comprises a power feeding side resonance capacitor constituting a power feeding side LC resonance circuit with the power feeding coil.

8. The wireless power transmission system according to claim 1, wherein, the small power feeding is performed using at least two different values of the output voltage values and the alternating current flowing in the power feeding coil is controlled based on the correlation between the different output voltage values and the different alternating current peak values corresponding to the different output voltage values, respectively, detected by the current detection circuit.

9. The wireless power transmission system according to claim 3, wherein, the controller controls the alternating current flowing in the power feeding coil by changing the input voltage of the inverter.

10. The wireless power transmission system according to claim 3, wherein, the controller controls the alternating current flowing in the power feeding coil by changing the driving frequency of the inverter.

11. The wireless power transmission system according to claim 3, wherein, the controller controls the alternating current flowing in the power feeding coil by changing the time ratio of the inverter.

12. The wireless power transmission system according to claim 3, wherein, the wireless power transmission system further comprises a power feeding side resonance capacitor constituting a power feeding side LC resonance circuit with the power feeding coil.

* * * * *